United States Patent [19]

Thorley

[11] 4,251,179

[45] Feb. 17, 1981

[54] WHEELCHAIR LIFT

[75] Inventor: Graham R. Thorley, San Diego, Calif.

[73] Assignee: Transportation Design & Technology, Inc., San Diego, Calif.

[21] Appl. No.: 41,943

[22] Filed: May 24, 1979

Related U.S. Application Data

[63] Continuation-in-part of Ser. No. 855,714, Mar. 13, 1978.

[51] Int. Cl.³ .............................................. B60P 1/46
[52] U.S. Cl. .................................. 414/545; 414/921; 280/166; 105/430
[58] Field of Search ...................... 414/540, 545, 921; 105/341, 430, 431, 437, 438, 447, 448, 443; 296/128; 280/163, 164, 166; 182/91, 95; 14/69.5, 71.1

[56] References Cited

U.S. PATENT DOCUMENTS

| | | | |
|---|---|---|---|
| 3,957,284 | 5/1976 | Wright | 280/166 |
| 4,027,807 | 6/1977 | Thorley | 105/430 |
| 4,081,091 | 3/1978 | Thorley | 414/545 |
| 4,168,134 | 9/1979 | Pohl | 414/545 |
| 4,176,999 | 12/1979 | Thorley | 280/166 |
| 4,180,366 | 12/1979 | Roth et al. | 414/540 |

Primary Examiner—Robert B. Reeves
Assistant Examiner—B. Bond
Attorney, Agent, or Firm—Henri J. A. Charmasson

[57] ABSTRACT

A hoisting device particularly suitable for lifting handicapped persons with or without wheelchairs, into a vehicle. The lift can be installed into the door well of a public transit bus or of a railroad car. It could also be incorporated into a step structure inside a building. The lift platform is made of four hinged, parallel sections which in the stowed position of the lift fold back to form two steps. The first parallel section which in the uppermost position of the platform meets the vehicle floor, or the upper step landing in a building, rotates along its forward edge to form the back of the upper step in the stowed position. The second section becomes the tread of the upper step while the third section forms the riser between the upper and lower step. The fourth section, which forms the tread of the lower step, houses an access ramp along its forward edge and a retractable flap which rotates upward to form an angle stop preventing the wheelchair from rolling back off the platform during motion of the lift.

9 Claims, 22 Drawing Figures

WHEELCHAIR LIFT

PRIOR APPLICATION

This application is a continuation in part of application Ser. No. 855,714 filed on Mar. 13, 1978.

BACKGROUND OF THE INVENTION

This invention relates to loading mechanisms, and more particularly to lift devices suitable for hoisting handicapped persons with or without wheelchairs into vehicles such as buses or other types of public conveyance. It also relates to lift devices suitable for helping such persons in negotiating steps at the entrance of, within, or without a building. Lift devices which in the past were designed for vehicular use were relatively bulky and cumbersome, taking up a great deal of space in the interior of such vehicles. It is clearly preferable to have the lift devices completely contained in the vehicles when such vehicles are in motion. The large size of previous lift mechanisms has often necessitated external location of at least a portion of such equipment. The vehicle cargo capacity has often been greatly reduced by the portion of the lift mechanism located inside the vehicle. The size and complexity of such lift mechanism often requires that a special opening be cut into the side of the vehicle, in addition to the normal entrances, in order to accommodate the lifts.

Attempts have been made to install such a lift within the door well of a public transit bus. To that effect, various ingenious ways were devised for moving the normal entrace steps away from the path of the lift platform. My original design disclosed in U.S. Pat. No. 4,027,807, teaches how the tread and riser elements of the entrance steps can be recombined to form the load-carrying surface of the lift platform. In some cases, however, these tread and riser elements are too narrow to provide a platform length sufficient to carry a wheelchair. Additional platform space has been provided by stretching the width of one of the step elements with extensions telescopically mounted within such an element; or with a ramp sliding forward from under the step structure or platform. This invention is the result of a search for a more efficient way to expend the width of the lift platform.

SUMMARY OF THE INVENTION

The principal object of the invention is to provide a handicapped lift which can be easily installed within the entry well of conventional public transit vehicles.

Another object of the invention is to provide such a lift which uses as part of its load-carrying platform the tread and risers of the normal entrance steps.

An additional object of the invention is to provide a means for extending the width of the platform beyond the load-carrying surface provided by such step elements.

These and other objects are achieved by replacing the normal entrance steps of a vehicle with a structure comprising a load-carrying platform made of four parallel sections. The sections are hinged together so that they can be folded into two steps in the stowed position of the lift. The outermost section of the platform becomes the tread of the lower step; the next section becomes the riser between the lower and upper step. The third section forms the tread of the upper step, while the last or innermost section of the platform is folded back behind the upper step. The supporting framework and lifting mechanism are conveniently installed along each side of the step well, and do not interfere with the normal use and operation of the vehicle. A rotating flap along the outer edge of the platform can be lowered to act as an exit ramp for a wheelchair. It can also be rotated upward to act as a stop preventing the wheelchair from falling off the platform during lifting motion.

DESCRIPTION OF THE PREFERRED EMBODIMENT OF THE INVENTION

Figure 1:
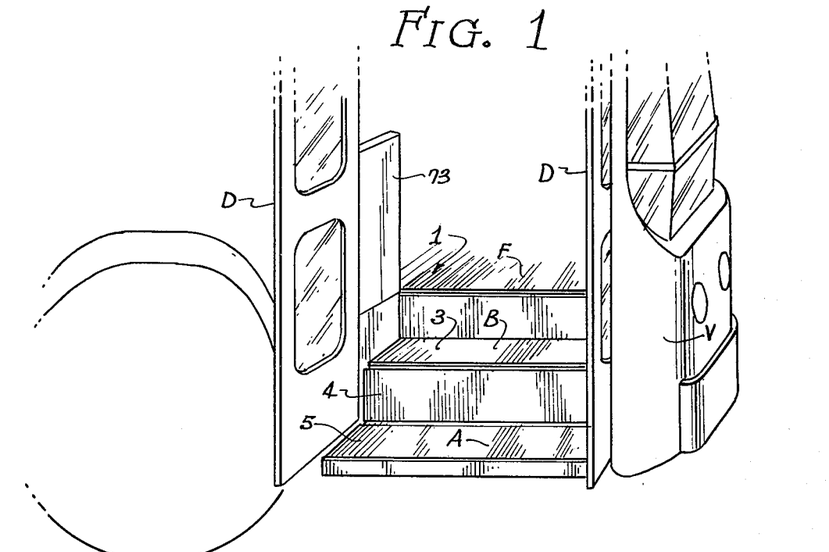
FIG. 1 is a perspective view of the wheelchair lift installed in the front door well of a bus, shown in the stowed, step position.
Figure 2:
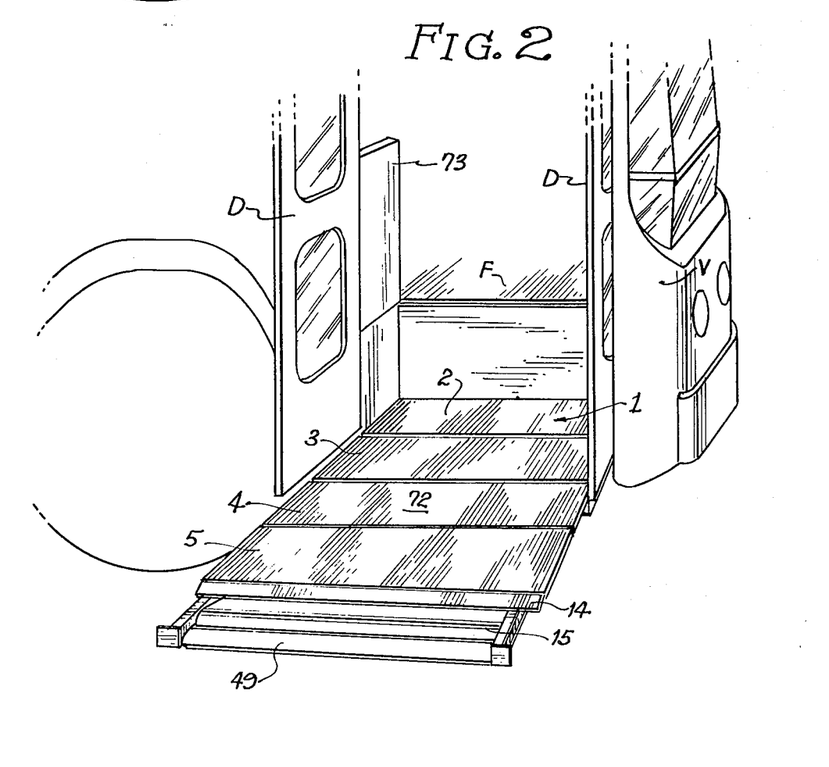
FIG. 2 is a perspective view of the wheelchair lift illustrated in FIG. 1 with the load-carrying platform deployed and lowered halfway toward the pavement.
Figure 3:
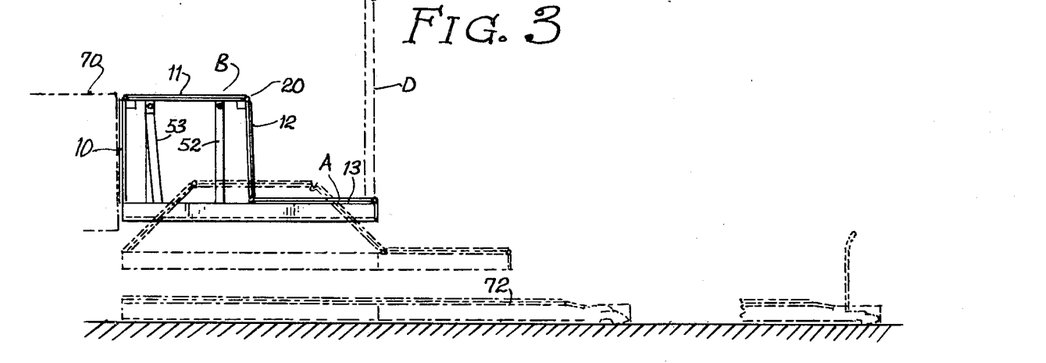
FIG. 3 is a left side view of the principal elements of the lift platform shown in their step position. Shown in phantom lines are intermediary positions of the elements as they are deployed to form a platform.
Figure 4:
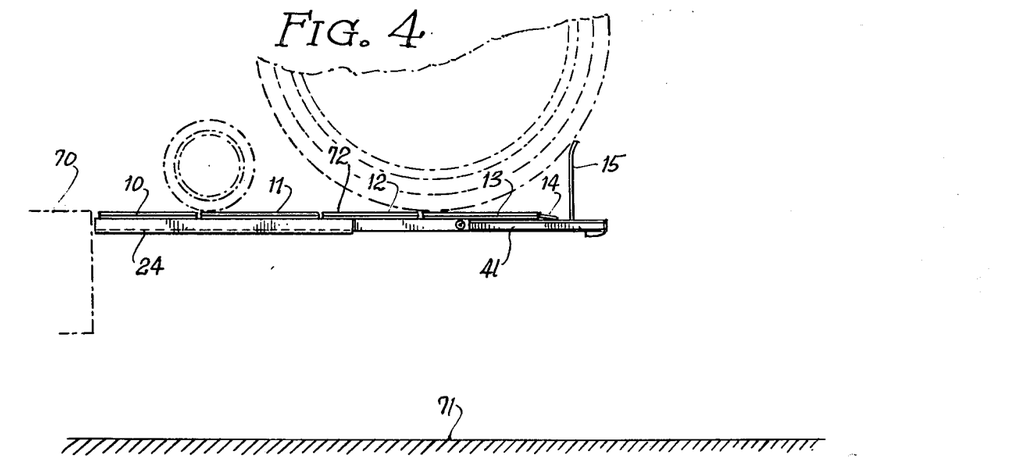
FIG. 4 is a left side view of the platform elements shown in their fully deployed position.
Figure 5:
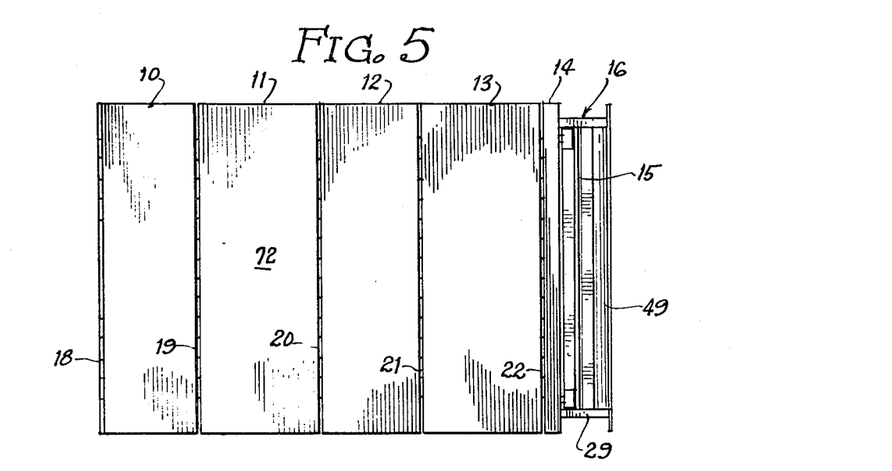
FIG. 5 is a top plan view of the platform elements in the fully deployed position.
Figure 6:
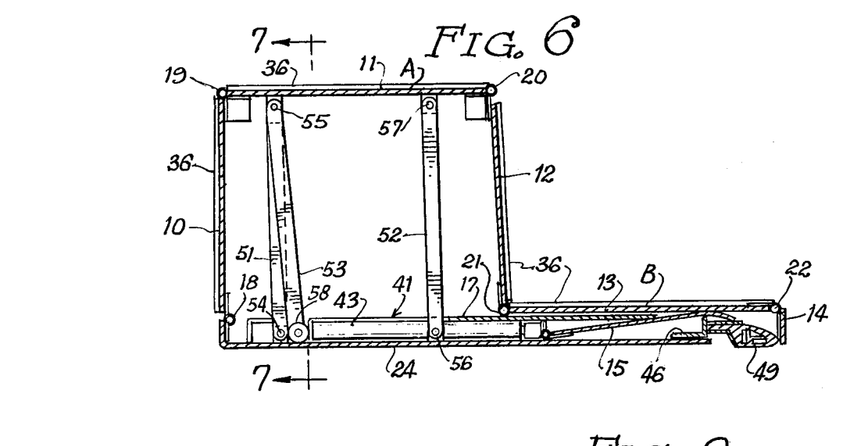
FIG. 6 is a lateral cross sectional view of the platform elements shown in the step position.
Figure 7:
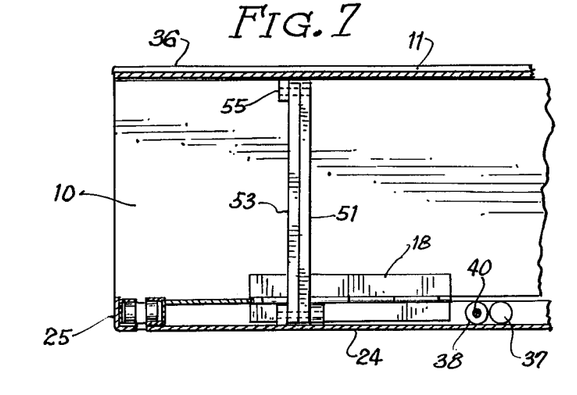
FIG. 7 is a partial cross sectional view taken along line 7—7 of FIG. 6.

Referring now to the drawing, and as an example of one embodiment of this invention, there is shown a wheelchair lift device 1 mounted within the doorway of a public transit bus. As illustrated in FIG. 1 the wheelchair lift 1 in its stowed position forms the normal entrance steps A and B of the vehicle V. In the active lift configuration illustrated in FIG. 2, the tread 5 of step A, the tread 3 of step B, and the normally vertical riser 4 between step A and step B, become part of the load-carrying surface of the lift platform 72. The back wall 2 of step B which is normally out of sight in the step position, also becomes part of the load-carrying platform 72. More specifically, as shown in FIG. 5, the load-carrying platform is made of several parallel sections 10, 11, 12, 13 and 14, which are articulated along their edges so that they may be folded back into a step configuration whereby sections 11 and 13 become the treads of steps B and A, respectively, section 12 becomes the riser between them, and section 10 forms the back of step. The articulation between the sections 10, 11, 12, 13 and 14 is provided by piano-type hinges 19, 20, 21 and 22 which allow sections 10, 12 and 14 to rotate from a horizontal position in the lift mode to a vertical position in the step mode.

Figures 17, 18, 19:
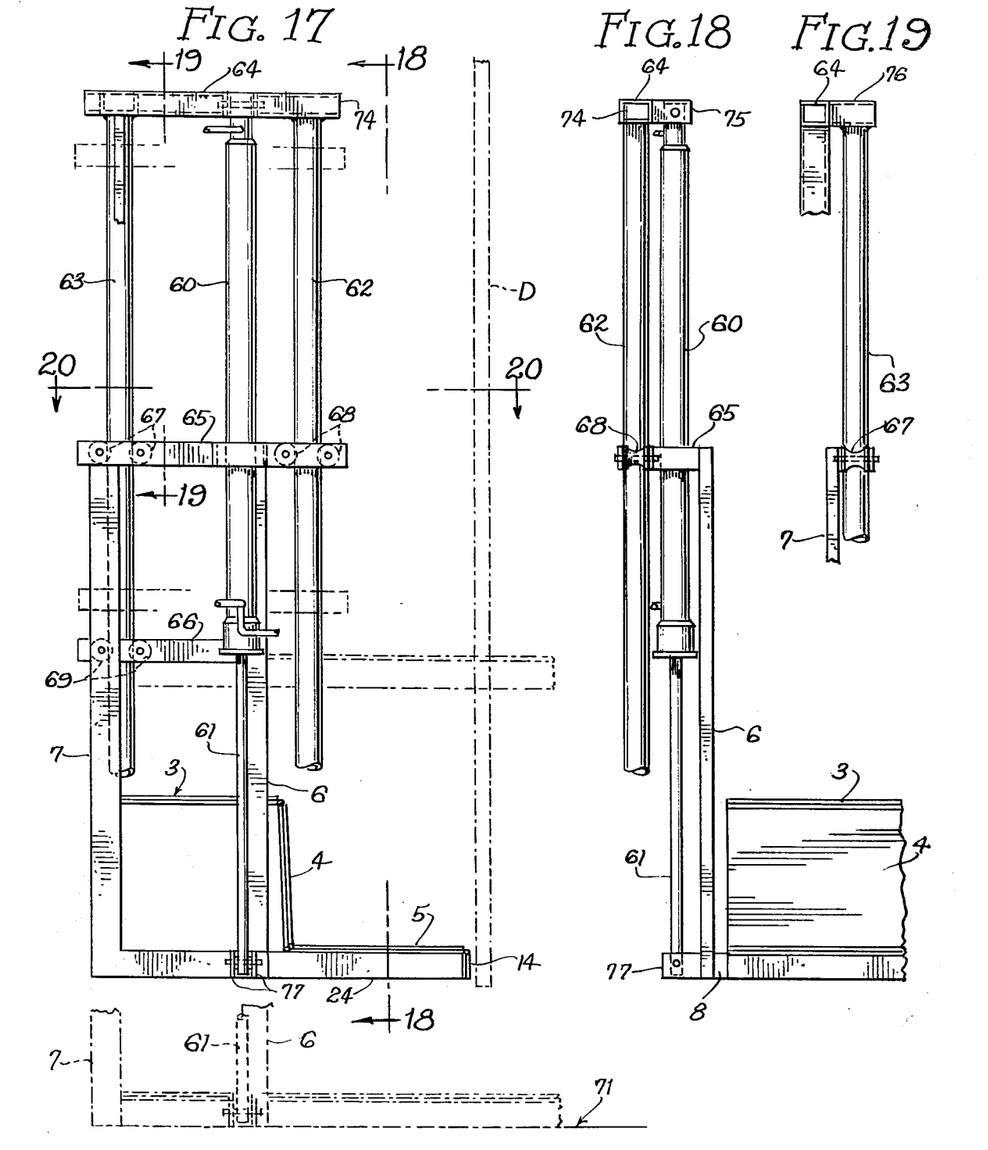
FIG. 17 is a right side view of the lift platform supporting structure and lifting apparatus.
FIG. 18 is a partial front view taken along line 18—18 of FIG. 17.
FIG. 19 is a front cross sectional view taken along line 19—19 of FIG. 17.
Figure 20:
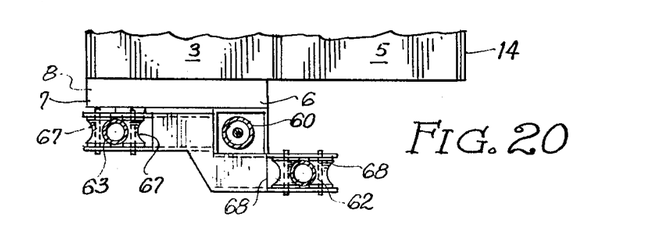
FIG. 20 is a top cross sectional view taken along line 20—20 of FIG. 17.

The infra structure of the lift 1 is formed by stationary, vertical guides mounted on each side of the door well, more specifically illustrated in FIGS. 17 through 19, and a carriage riding up and down between these vertical guides supporting the platform elements and their folding and unfolding mechanism. The vertical guides comprise a pair of cylindrical columns 62 and 63, which are shrouded by a tower-like enclosure 73. The columns 62 and 63 are bolted at their base into the chassis of the vehicle V. They are capped at the top by a L-shaped stanchion 64 upward end 74 may be fastened to the inside wall of the vehicle V along the edge of the doorway. The spacing distance across the threshold between the forward columns 62 is slightly larger than the spacing between the inward columns 63 which terminate against the right angle turn 76 of the capping stanchions 64. The columns 62 and 63 and stanchions 64 are the only stationary and static components of the wheelchair lift 1.

Figures 8, 9:
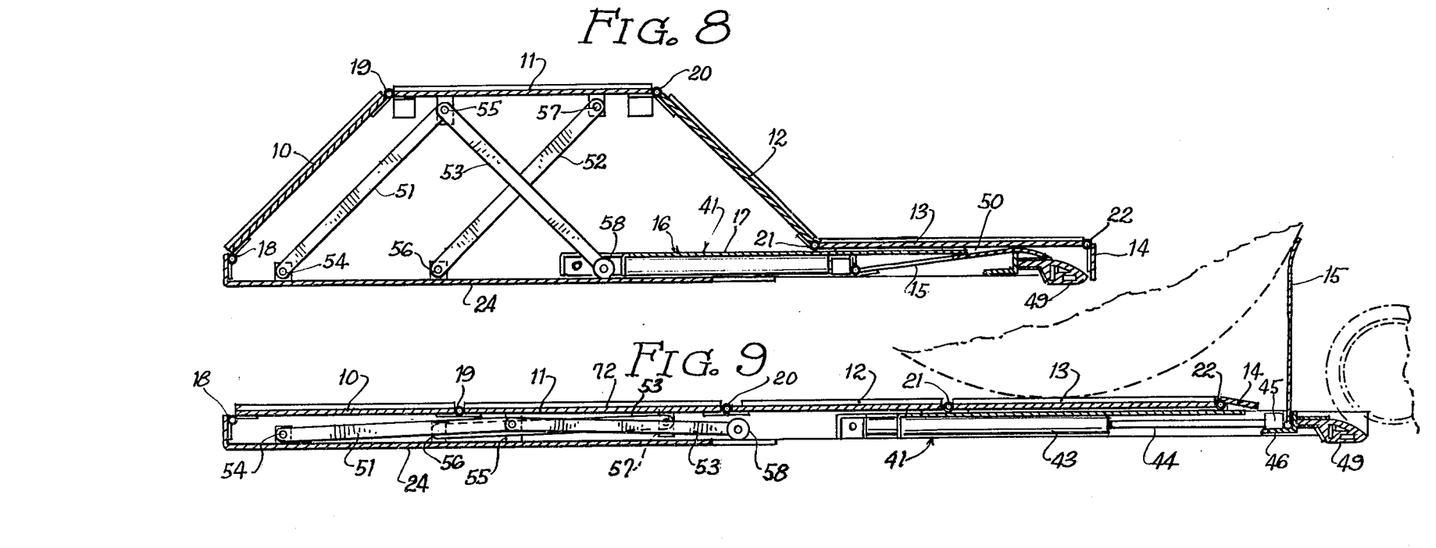
FIG. 8 is a lateral cross sectional view of the step element shown in a intermediary position between the step and platform positions.
FIG. 9 is a lateral cross sectional view of the platform elements shown in their fully deployed position.
Figures 10, 11, 12:
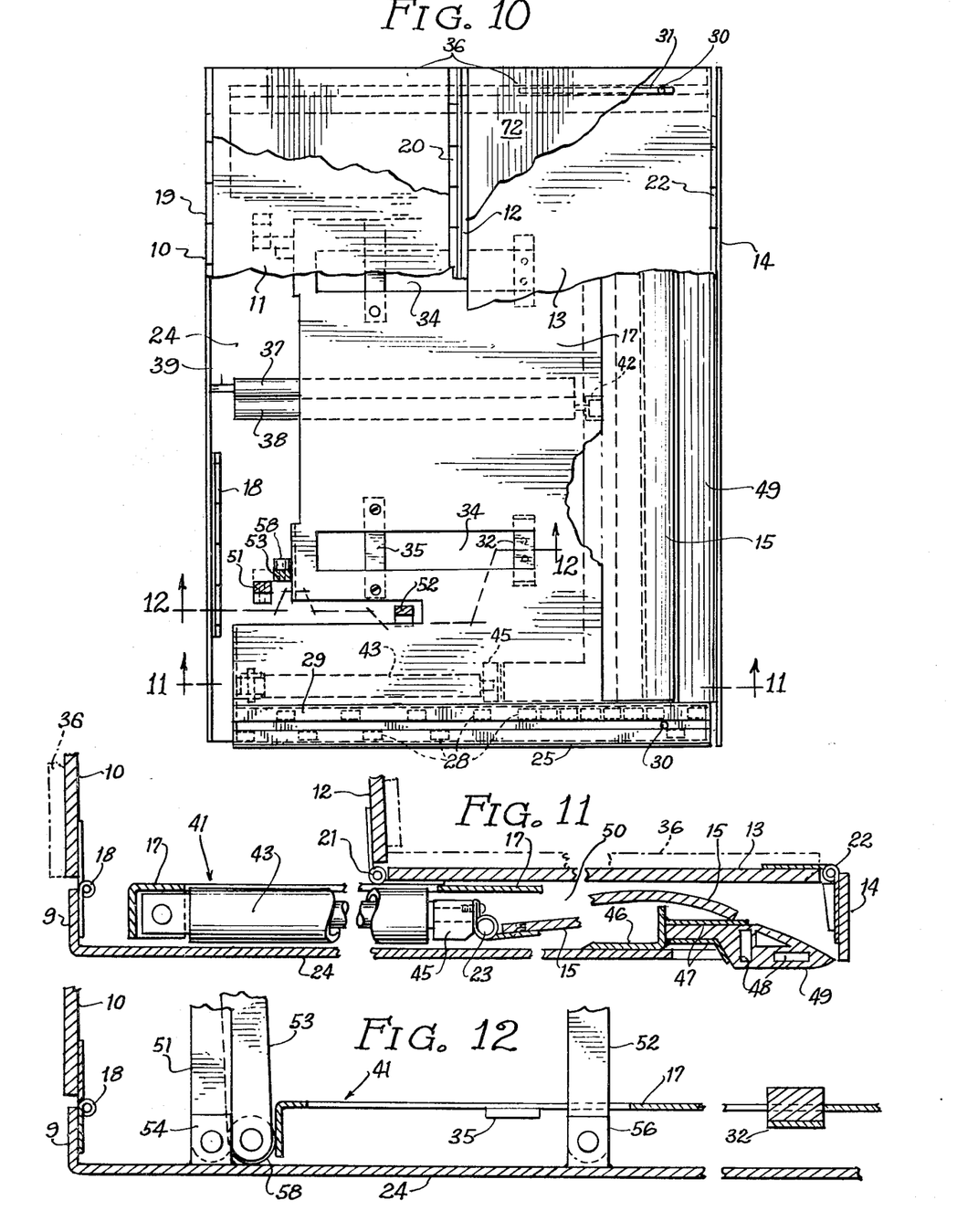
FIG. 10 is a top plan view of the platform elements shown in the step position, with cutaway portions exposing the various structural components.
FIG. 11 is a partial cross sectional view taken along line 11—11 of FIG. 10.
FIG. 12 is a partial cross sectional view taken along line 12—12 of FIG. 10.
Figures 13, 14:
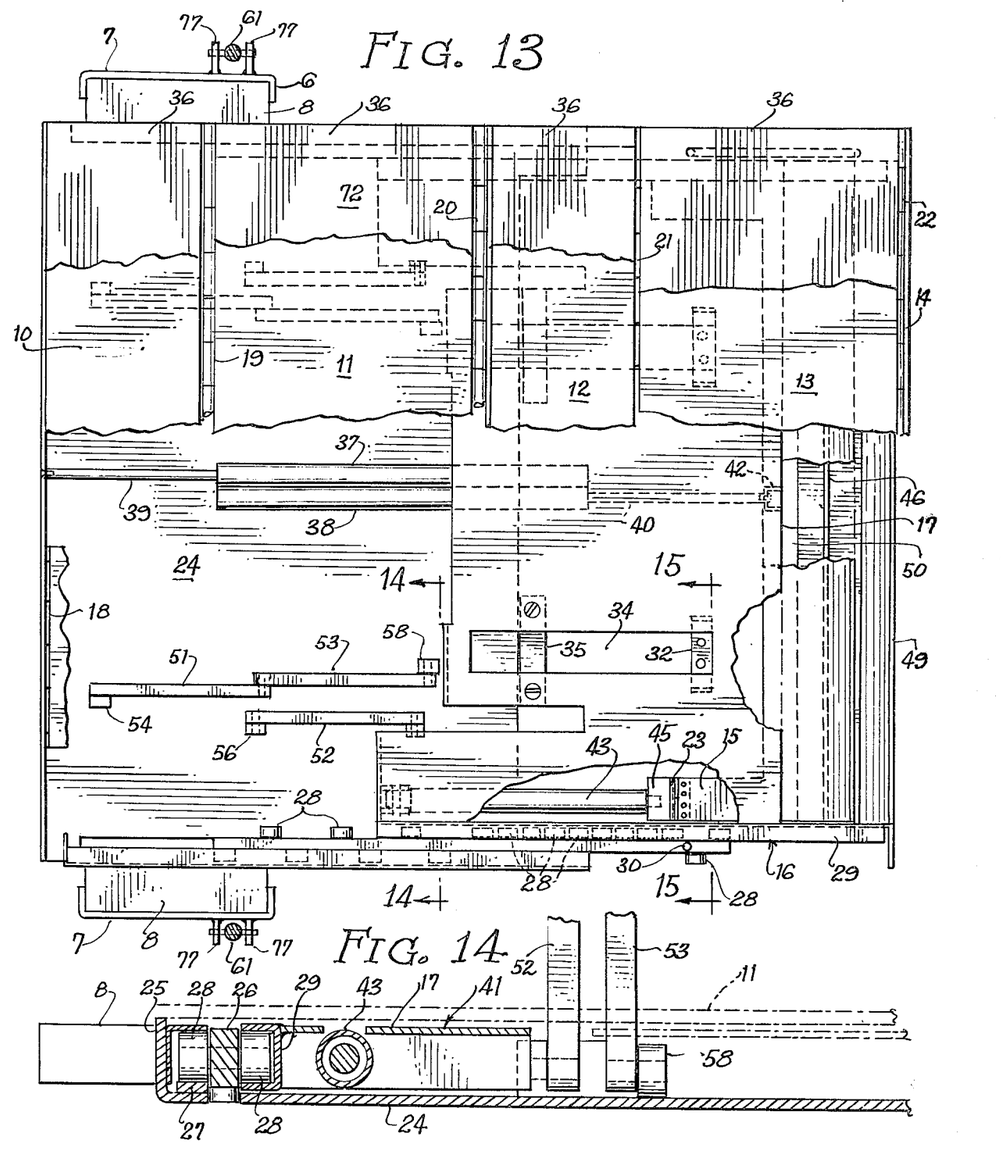
FIG. 13 is a top plan view of the platform elements shown in a partly deployed position with cutaway portions exposing various structural components.
FIG. 14 is a partial cross sectional view taken along line 14—14 of FIG. 13.
Figure 15:
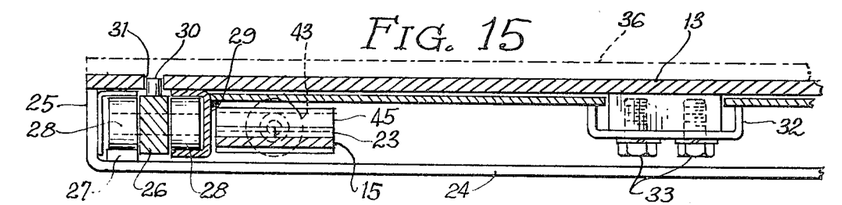
FIG. 15 is a partial cross sectional view taken along line 15—15 of FIG. 13.
Figure 16:
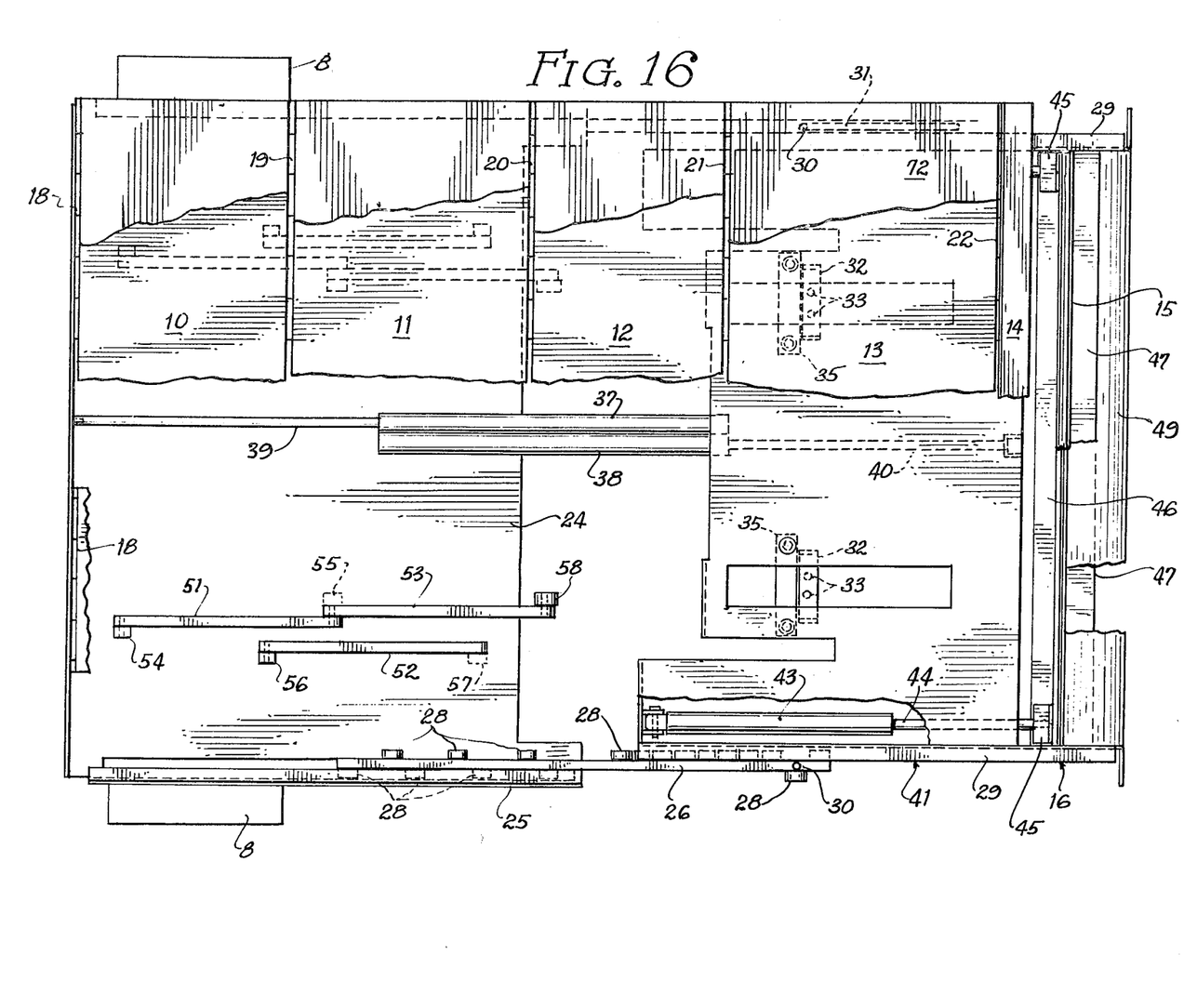
FIG. 16 is a top plan view of the platform elements shown in their fully deployed position with cutaway portions exposing various structural components.
Figure 21:
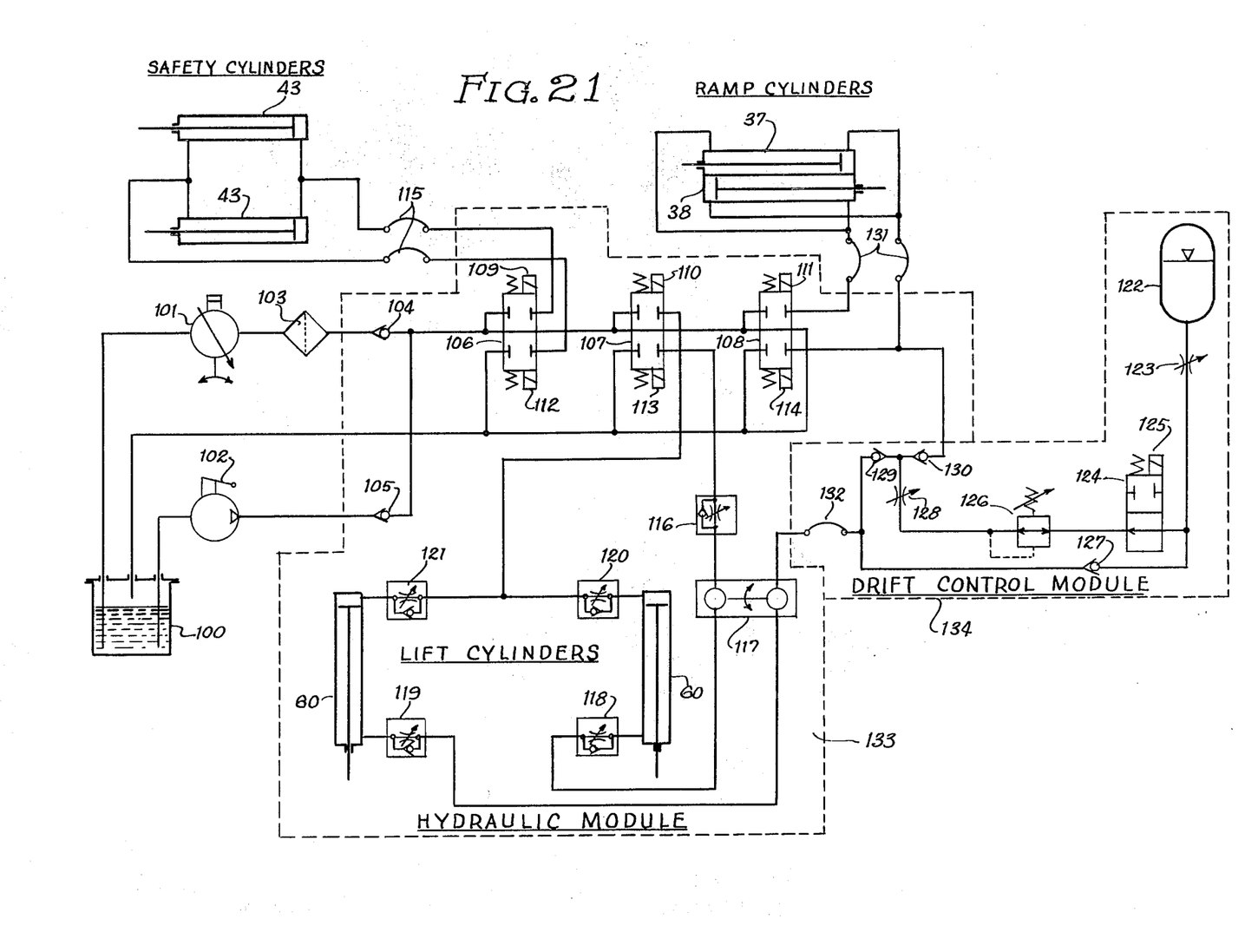
FIG. 21 is a schematic of the hydraulic system.

The principal components of the platform-supporting carriage are the base or skid plate 24 and the lateral vertical elements formed by parallel members 6 and 7, cross members 65 and 66 and roller assemblies 67, 68 and 69, capturing the vertical columns 62 and 63. The carriage is supported and moved by a pair of hydraulic lift cylinders 60 suspended from a bracket 75 on the side of stanchions 64. The lifting rods 61 of the cylinders 60 are attached to the skid plate 24 by brackets 77. Each of the roller assemblies 67, 68 and 69 comprises a pair of pulley-shaped rollers having grooved rims matching the convexity of the cylindrical columns 62 and 63 in order to provide a smooth and stable movement of the carriage vertically along and between the cylindrical columns. The rod bracket 77 is mounted on a block 8 secured to the lateral bend 25 of the skid plate 24. The depth of the skid plate 24 does not exceed the depth of the door well. When the lift 1 is not in use all the platform elements and operating mechanisms are withdrawn above the skid plate 24 within the confines of the door well behind the closed doors D of the vehicle V. In the lift configuration, the carriage is expanded by a movable ramp 41 supported on each side by a pair of sliding beams 26. A series of roller bearings 28 are mounted on each side of the sliding beams 26. The inside rollers are captured by a U channel 29 attached to the side of the ramp 41. On the other side of the beam 26 the rollers 28 ride on a rail 27 bonded to the skid plate 24. As illustrated in FIG. 16, the ramp 41 can be shifted outward beyond the forward edge of the skid plate 24 and supported in a cantilevered manner by the beams 26 and rollers 28 assemblies. Section 10 of the platform 72 is attached to the back upbend 9 of the skid plate 24 by a hinge 18. Section 13 of the platform 72 has two slots 31 cut immediately above the sliding beams 26. A pair of dowel pins projecting from the top surface of the beams 26 are captured within the slot 31. The dowel pins 30 cause the step section 13 to be pulled outward when the ramp 41 is shifted under the action of hydraulic cylinders 37 and 38. The dowel pin 30 and slot 31 arrangement also limits the travel of the sliding beams 26. The length of the slots 31 also defines the limits of the shifting movement of the ramp 41 in relation to the platform section 13. The ramp 41 is also connected to the platform section 13 by two U-shapped supports 32 held by cap screws on threaded stems 33 projecting from under the platform section 13 and through slots 34 cut in the roof 17 of the ramp 41. Barriers 35 laid across the slots 34 also limit the travel of the ramp 41 in relation to the platform section 13. The maximum platform deployment is conveniently achieved by using two hydraulic cylinders 37 and 38 mounted back to back and activated simultaneously. The rod 40 of the forward oriented cylinder 38 is attached to bracket 42 mounted near the forward edge of the ramp 41. It can now be understood that by shifting the ramp 41 under the action of the combined cylinders 37 and 38, the multisectional platform 72 can either be deployed into a load-carrying surface or folded back into a step configuration within the door well of the vehicle. At the forward end of the ramp 41 an angled segment 46 held between the two U channels 29 has two projections 47 holding a sensitive edge 49. The sensitive edge 49 is made of resilient material surrounding pressurized air cavities 48. When the sensitive edge 49 is deformed, upon contact with an obstacle such as sidewalk curb, the pressure change in the cavities 48 is used to trigger a safety switch. A safety flap 15 protrudes through a gap 50 between the angled member 46 and the ceiling 17 of the ramp 41. The safety flap 15 is pivotally mounted by means of hinges 23 on blocks 45 at the end of rods 44 of two hydraulic cyllinders 43. The closed ends of the cylinders 43 are secured to the ramp plate 17. When the cylinder rods 44 are fully withdrawn, the curved portion of safety flap 15 bridges the gap between the platform section 14 and the sensitive edge 49. When the rods 44 are fully extended as illustrated in FIG. 9, the safety flap 15 is forced to an erect position against the angled member 46. During platform folding and unfolding operation, section 11 is held horizontal by effect of the parallelogram linkage constituted by brace 52 pivotally connected to the skid plate 24 at 56 and to the horizontal section 11 at 57, and the back section 10 of step B. The brace 51 parallel to brace 52, and similarly attached, is used in conjunction with lever 53 to reduce the stress on hinges 18, 19 and 20. A roller 58 attached to the lower end of lever 53 rides on the top surface of the skid plate 24. When the ramp 41 is withdrawn, its inward edge comes into contact with the lower end of lever 53 applying a lifting pressure upon platform section 11. The lower end of the pivot block attachment 55 comes into contact with the upper surface of the skid plate 24 maintaining an angular position between the brace 51 and lever 53 sufficient to avoid locking of the lifting mechanism. For safety reasons, platform sections 10, 11, 12 and 13 are covered with mats 36 made of rubber-like, anti-skid material. Referring now to FIG. 21, I shall describe the hydraulic components of the device. Hydraulic fluid is drawn from reservoir 100 by motor pump 101 and sent through filter 103 and check valve 104 to feed the solenoid control valves, 106, 107 and 108. Each one of these valves has two alternate spring-loaded output gates controlled by solenoids. Valve 106 is used to control the operation of the safety flap cylinders 43. When solenoid 109 is energized, fluid is supplied to the back of the cylinders 43 through flexible lines 115, causing the rods to extend out of the cylinders 43 and to raise the safety flap 15. Alternately, when solenoid 112 is energized, the fluid is supplied to the front of the cylinder's piston, causing the rods to withdraw inside the cylinder and the lowering of safety flap 15. Valve 107 is used in the same manner to control the operation of the vertical lifting cylinders 60. Solenoid 110 controls the downward motion of the rods while solenoid 113 is energized when the lift carriage has to be raised. Adjustable valves 118, 119, 120, and 121 are used during maintenance of the system to balance the flow of fluid between the left and right cylinders 60 in order to avoid any binding in the vertical movement of the carriage. Valve 108 is used to control the operation of the ramp cylinders 37 and 38 used to fold and unfold the load-carrying platform 71. Solenoid 111, when energized, causes the shifting forward of the ramp 41. In order to avoid slow drift in the position of the steps A and B due to temperature change in the fluid or line and cylinder leakages, fluid pressure within cylinders 37, 38 and 60 is maintained constant by means of an accumulator packaged in the drift control module 134. In a tank 122, the fluid is maintained under pressure by nitrogen gas captured in the upper closed area of the tank 122. A solenoid controlled, normally open valve 124 feeds the pressurized fluid to a pressure reducing valve 126 which drops the fluid pressure from approximately 1,500 pounds per square inch (105.5 kilograms per square centimeter) down to 200 pounds per square inch (14.06 kilograms per square centimeter). The regulating fluid is fed to the vertical lifting cylinders 60 through a flow divider 117 in order to avoid any unbalance between the left and right lifting cylinders 60. When the lift is operated the valve controlling solenoid 125 is energized, interrupting the flow of pressurized fluid to the system. A hand pump 102 is provided as a bypass of the motorized pump 101 to allow manual operation of this system in case of electrical power failure in the vehicle. Valves 106, 107 and 108 are also provided with handles for manual operation. Adjustable valve 128 in the drift control module 134 is used to manually shut off the flow of pressurized fluid when the lift is manually operated. Valve 123 is used to close the output of tank 122 during maintenance operations. Most of the hydraulic control elements are located in a hydraulic module housing 133 located in an area of the vehicle readily accessible to the driver.

Figure 22:
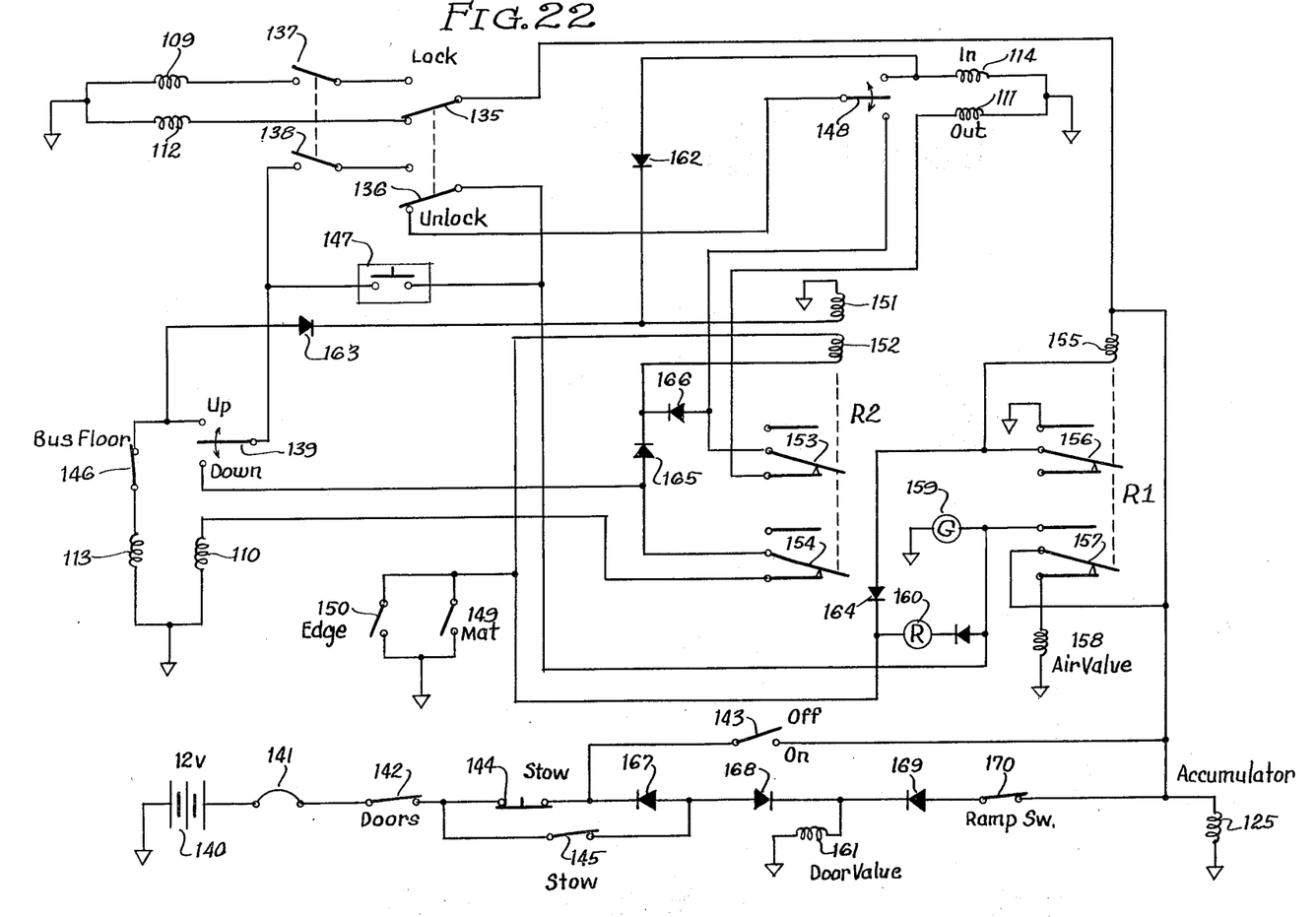
FIG. 22 is a schematic of the electrical system.

Referring now to FIG. 22 in addition to FIG. 21, I shall describe the operation of the electrical components of the wheelchair lift. The electrical power for the system is derived from the vehicle 12 volt battery 140 which is protected by a fuse 141. The power supply is first run through a switch 142 which closes only when the vehicle doors D are fully open; then through the normally closed STOW switch 144 before reaching the master ON/OFF switch 143. When the master switch 143 closes, solenoid 158 is energized through closure 157 of relay R-1. Solenoid 158 controls an air valve which sends pressurized air into the cavity 48 of the sensitive edge 49 at the forward edge of the platform 41. The increase in air pressure in the sensitive edge 49 causes the closure of switch 150. At this point, the coil 155 of relay R-1 is energized through diode 164. The air valve solenoid 158 is de-energized, causing the pressurized air to bleed out of the sensitive edge 49, and re-opening switch 150. The relay coil 155 is kept energized through closure 156, and a green light indicator 159 is lit through closure 157. Power is also applied to solenoid 125 which causes the closure of the accumulator valve 124, and to solenoid 161 which controls a valve in the vehicle door opening mechanism preventing the doors from being closed while the lift is operated. The platform 72 can now be deployed or withdrawn by manipulation of switch 148 which energizes solenoid 114 or 110 controlling the ramp cylinders valve 108. Once the platform section 11 is lowered to the level of platform section 13, switches 137 and 138 close. The safety flap 15 can be raised or lowered by way of switch 135 which enegizes solenoid 109 or 112 controlling the operation of the safety cylinders valve 106. With the safety flap control switch 135 and 136 in the LOCK position, the platform can be lowered or raised by operation of the UP/DOWN switch 139 which energizes solenoid 110 or 113 controlling the lifting cylinders valve 107. The upward movement of the platform 72 will be interrupted by the opening of switch 146 when the platform reaches the level of the vehicle floor. A pushbutton bypass switch 147 allows the operation of the lifting cylinders regardless of the position of the platform element 11 or that of the safety flap 15, by bypassing switches 136 and 138. If during the unfolding or lowering of the platform 72, an obstacle comes into contact with either the sensitive edge 49 or the bottom of the skid plate 24, switch 150 or 149, respectively, are closed. Any one of these switch closures will energize coil 152 of relay R-2 causing immediate interruption of the platform movement, and lighting a red indicator 160. At this point, the operator must flip switch 148 to the IN (folding) position or switch 139 to the UP (lifting) position. Either one of these maneuvers energizes coil 151 of relay R2 through diode 162 or diode 163, which in turn counteracts the effect of coil 152 allowing contact closures 153 and 154 to return to their normal state. If the driver wants to return the lift structure to its stowed location in relation to the bus floor, he activates the STOW switch 144. He can now operate the lift only so long as switch 145 remains closed. Switch 145 will open as soon as the carriage reaches its proper stowed position. A switch 170 which opens only when the ramp 41 is fully withdrawn into the inward portion of the carriage, keeps the door control valve solenoid 161 energized preventing the closure of the doors until the platform elements have returned to this step configuration. The various manually controlled switches and indicators are mounted on a panel installed on the dashboard of the vehicle or at any convenient place readily accessible to the driver of the vehicle.

While I have described one of the preferred embodiments of my invention and its application in the entrance door well of a transit bus, other embodiments and other applications may be devised and modifications may be made thereto without departing from the spirit of the invention and from the scope of the appended claims.

I claim:

1. A device acting alternately as a load-carrying lift or as a step structure between a lower level and an upper level which comprises:

a multi-sectional platform comprising at least first, second and third parallel sections laid side by side wherein the second section lies between the first and third section, said sections forming part of the load-carrying surface of the lift;

means for moving the platform between the lower level and the upper level;

means for pivotally articulating the first section in relation to the second section about a first axis located along their adjacent edges;

means for pivotally articulating the third section in relation to the second section about a second axis located along their adjacent edges;

means for placing the first and third sections to a substantially vertical position; and means for maintaining the second section in a substantially horizontal position between and above said substantially vertical sections while rotating said first and third sections about said axes.

2. The device claimed in claim 1 wherein said multi-sectional platform comprises:

a fourth parallel section adjacent to the third section;

means for pivotally articulating the third section in relation to the fourth section about a third axis located along their adjacent edges; and means for supporting said multi-sectional platform.

3. The device claimed in claim 2 wherein said means for supporting comprise:

a carriage having a inward portion supporting the first section;

a cantilevered outward portion supporting the fourth section; and means for pivotally articulating the first section in relation to the first portion of the carriage about a fourth axis located substantially along the inward edge of the first section.

4. The device claimed in claim 3 wherein said cantilevered portion comprises:

a support plate;

a beam on each side of the plate;

means for slidingly connecting each beam to one side of the plate; and means for slidingly connecting each beam to the inward portion of the carriage whereby the beams and support plate can be slided telescopically inward within the confines of the inward portion of the carriage.

5. The device claimed in claim 4 which further comprises:

means for connecting the first section to the support plate; and wherein said means for placing comprise at least one hydraulic cylinder associated with the carriage for withdrawing the support plate and beams towards the inward portion of the carriage.

6. The device claimed in claim 1 or claim 5 wherein said means for moving the platform comprise:

at least one vertical stationary guide near each side of the platform; and means for lifting the platform along and between said vertical guides.

7. The device claimed in claim 6 wherein said vertical stationary guides comprise:

a pair of cylindrical columns near each side of the carriage;

said carriage comprises rollers affixed upon lateral parts of the carriage riding along said columns; and said means for lifting comprise at least one hydraulic cylinder applying a vertical motion to said carriage.

8. The device claimed in claim 1 or claim 2 wherein said means for moving the platform comprises:

at least one hydraulic cylinder having a piston rod applying a vertical motion to the platform;

a first source of pressurized fluid;

valve means between said first source of pressurized fluid and said hydraulic cylinder for activating said piston rod in a bi-directional movement;

a regulated second source of pressurized fluid; and means for applying said second source of pressurized fluid to said hydraulic cylinder in place of said first source when the device is not in use.

9. The device claimed in claim 4 wherein said support plate comprises:

a transversal member along the forward edge of the support plate;

a flap parallel to said transversal member, laid flat within said support plate; and means for placing said flap to a vertical position against said transversal member, whereby said flap forms a vertical barrier near the forward edge of the platform.

* * * * *